Nov. 6, 1934.   H. B. McCLURE   1,979,632
FRUIT PICKING BAG
Filed March 7, 1934
Fig.1
Fig.2
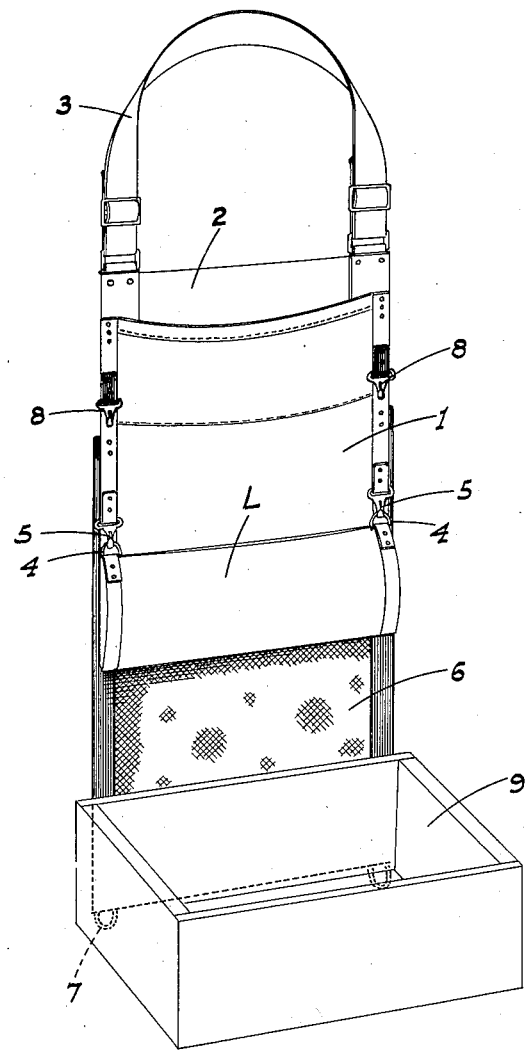
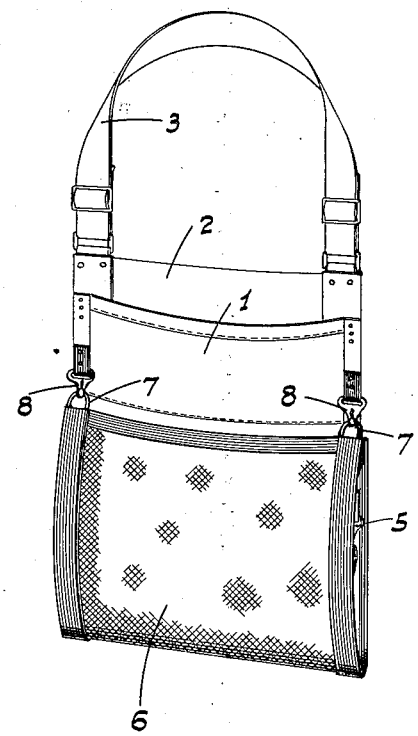
INVENTOR
H. B. McClure
BY
ATTORNEY Patented Nov. 6, 1934

1,979,632

UNITED STATES PATENT OFFICE 1,979,632

FRUIT PICKING BAG

Harry B. McClure, Visalia, Calif.

Application March 7, 1934, Serial No. 714,469

3 Claims. (Cl. 150—2)

This invention relates to fruit picking bags such as are used in the citrus industry in gathering fruit from the trees, as well as in connection with the picking of other fruits. Such bags are constructed with both ends open, the bottom discharge end while the fruit is being picked being folded upwardly and releasably held against dropping to form a closure for the bottom so as to retain the fruit. When it is desired to discharge the contents of the bag into a box, the folded portion is released and of course drops and the fruit then rolls freely into the box. As the bags are now made, dirt, sand and other foreign matter is apt to accumulate on the exterior of the bag during picking operations and becomes discharged with the fruit into the box, which of course is very objectionable.

It is therefore the principal object of my invention to avoid this objectionable feature by providing bags of the above character with a protecting apron which catches dirt instead of the latter being deposited on the bag itself, and arranged so that its dirt retaining surface will be moved out of the way of fruit discharging operations and clear of the box so that no dirt can get into the latter. At the same time the apron is permanently mounted on the bag, does not intererfere in any way with picking operations as now practiced, and is very easily released when desired.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view of a standard fruit picking bag showing the apron unfolded and in a depending position outside a box into which the fruit is to be dumped.

Figure 2 is a similar view showing the apron folded and in the position occupied when the fruit is being picked.

Referring now more particularly to the characters of reference on the drawing, the bag which as above stated is of standard character, comprises front and back sheets 1 and 2 respectively, made of canvas or the like secured together along their sides and freely open at top and bottom. The back sheet projects above the front sheet somewhat and to its upper corners are fastened the ends of a tack engaging loop 3.

The lower portion L of the bag during picking operations is folded upwardly and in front to prevent fruit dropping through the bottom opening, the corners of the folded portion having rings or eyes 4 detachably engaging snap hooks 5 mounted on the front of the bag at the sides and intermediate its top and bottom. This is standard bag construction and as used the exposed portion of the bag, especially on the bottom and in front, is apt to come in contact and retain sand, dirt etc., which will be deposited in the box into which the picked fruit is dumped when the bag is positioned to overhang the box and the folded portion is let down.

My improvement comprises an apron 6 also of canvas or similar material and preferably bound with leather. This apron is slightly wider than the bag itself and is securely fastened along its upper edge to the back sheet 2 of the bag nearer the top. The length of the apron is such that when folded upwardly and in front of the bag when the lower portion of the latter is likewise folded, said apron will then extend some distance above the folded portion of the bag, as shown in Figure 2. The apron is releasably held in such folded position by means of rings 7 at its free corners which releasably engage snap hooks 8 mounted on the front of the bag at the sides and at a level such that the folded portion of the apron will then be retained in the above desired position.

When it is desired to discharge fruit from the filled bag into a box 9, the apron is first unfastened from the hooks and allowed to drop on the outside of the box behind the same, as indicated in Figure 1. The folded portion of the bag is then exposed for unfastening and lowering into the box and it will be seen that it is in a perfectly clean condition, with no dirt possibly adhering thereto which can fall into the box with the fruit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. In combination with a fruit picking bag having an intake opening at its upper end and another opening at its lower end for the discharge of the fruit, said lower opening being normally closed; a flexible apron secured at its upper end on the back of the bag toward the top of the same, the length of the apron being such that its lower portion may be folded upwardly in front of the bag and above said lower opening, and means to releasably retain the apron in such folded position.

2. In combination with a fruit picking bag having an intake opening at its upper end and another opening at its lower end for the discharge of the fruit, said lower opening being normally closed; a flexible apron secured at its upper end on the back of the bag toward the top of the same, the length of the apron being such that its lower portion may be folded upwardly in front of the bag and above said lower opening, and cooperating means between the free corners of the apron and the bag at the sides to releasably maintain the apron in such folded position.

3. In combination with a fruit picking bag having an intake opening at its upper end and another opening at its lower end for the discharge of the fruit, the lower portion of the bag being adapted to be folded upwardly in front of the bag to prevent such discharge while loading the bag, a flexible apron secured at its upper end on the back of the bag above the folded portion, the length of the apron being sufficient to enable it to be folded upwardly and forwardly to enclose said folded portion of the bag, and means releasably holding the folded portion of the apron from dropping.

HARRY B. McCLURE.